US012608712B2

(12) United States Patent
Ryan, Jr. et al.

(10) Patent No.: US 12,608,712 B2
(45) Date of Patent: Apr. 21, 2026

(54) SYSTEM AND METHOD FOR GENERATING POSTAGE

(71) Applicant: Pitney Bowes Inc., Stamford, CT (US)

(72) Inventors: Frederick W. Ryan, Jr., Oxford, CT (US); Tarunya Goel, Brooklyn, NY (US); Paresh Sahasrabudhe, North York (CA); William Rodriguez, Stratford, CT (US); Chintapalli S. Reddy, Trumbull, CT (US); Henry Rogando, S. Arlington, VA (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 17/539,610

(22) Filed: Dec. 1, 2021

(65) Prior Publication Data

US 2022/0188834 A1     Jun. 16, 2022

Related U.S. Application Data

(60) Provisional application No. 63/123,542, filed on Dec. 10, 2020.

(51) Int. Cl.
*G06Q 20/42*        (2012.01)
*G06Q 20/38*        (2012.01)
*G06Q 20/40*        (2012.01)

(52) U.S. Cl.
CPC ........... *G06Q 20/42* (2013.01); *G06Q 20/389* (2013.01); *G06Q 20/401* (2013.01)

(58) Field of Classification Search
CPC ..... G06Q 20/42; G06Q 20/389; G06Q 20/401

USPC .......................................................... 705/44
See application file for complete search history.

(56) References Cited

U.S. PATENT DOCUMENTS

| | | | | |
|---|---|---|---|---|
| 6,064,993 A | * | 5/2000 | Ryan, Jr. ............ | G07B 17/0008 705/62 |
| 6,151,591 A | * | 11/2000 | Pierce ................ | G07B 17/0008 705/401 |
| 6,839,695 B2 | * | 1/2005 | Igval ................ | G07B 17/00024 705/410 |
| 6,904,419 B1 | * | 6/2005 | Pintsov ................ | H04L 63/062 705/30 |

(Continued)

*Primary Examiner* — Bennett M Sigmond
*Assistant Examiner* — Michael J Warden
(74) *Attorney, Agent, or Firm* — Ruggiero McAllister & McMahon LLC; Edward L McMahon

(57) ABSTRACT

A postage generating system and method that allows for the generation of postage without the use of a PSD, while still maintaining the necessary data integrity and non-repudiation aspects. The cryptographic and accounting functions are performed separately when an indicium is generated and reconciled to ensure that every transaction is properly accounted for and funds are deducted from the user's account. The cryptographic functions for an indicium are performed utilizing a cloud-based Hardware Security Module (HSM). Transaction records for indicium generated by an HSM are stored in a database. The accounting is performed by a transaction server, separate and remote from the HSM, to make updates to the client's account to account for generated indicia. An Integrity Monitor Server monitors the consistency of the transactions, i.e., that every transaction performed by an HSM is properly accounted for by the transaction server and funds are deducted from the user's account.

22 Claims, 7 Drawing Sheets

(56)     References Cited

U.S. PATENT DOCUMENTS

| | | | | |
|---|---|---|---|---|
| 8,360,313 | B1* | 1/2013 | Leon ................. | G07B 17/00508 |
| | | | | 235/383 |
| 2004/0177050 | A1* | 9/2004 | Athens ............. | G07B 17/00362 |
| | | | | 705/401 |
| 2012/0179766 | A1* | 7/2012 | Gracy .................. | G06Q 10/107 |
| | | | | 709/206 |
| 2014/0032807 | A1* | 1/2014 | Monroe ............. | G07B 17/0008 |
| | | | | 710/305 |
| 2016/0171638 | A1* | 6/2016 | DeFilippo ........ | G07B 17/00435 |
| | | | | 705/408 |
| 2018/0374087 | A1* | 12/2018 | Lu ........................ | G06Q 20/382 |
| 2021/0103904 | A1* | 4/2021 | Bayer .................. | G06Q 10/083 |
| 2022/0188834 | A1* | 6/2022 | Ryan, Jr. .............. | G06Q 20/401 |
| 2022/0300318 | A1* | 9/2022 | Buddha ................ | G06Q 20/401 |

* cited by examiner

SYSTEM AND METHOD FOR GENERATING POSTAGE

This application claims the benefit of prior provisional application 63/123,542 filed Dec. 10, 2020, the entire contents of which is hereby incorporated by reference.

FIELD OF THE INVENTION

The invention disclosed herein relates generally to systems and methods for generating evidence of postage payment, and more particularly to postage generating systems in which postal security devices are not required for the generation of postage.

BACKGROUND OF THE INVENTION

Postage metering systems generate cryptographically secured information, using, for example, encryption, digital signatures, message authentication codes, and the like, that is printed on a mail piece as part of an indicium evidencing postage payment. The encrypted information includes a postage value for the mail piece combined with other postal data that relate to the mail piece and the postage meter printing the indicium. The encrypted information authenticates and protects the integrity of the information, including the postage value, imprinted on the mail piece for later verification of postage payment. Since the indicium incorporates the encrypted information relating to the evidencing of postage payment, altering the printed information in an indicium is detectable by standard verification procedures.

Conventional postage printing systems utilize pre-paid accounts in which funds are stored in a register for use to generate and print postage. Such funds are stored in a secure device, known as a postal security device (PSD). A PSD is a secure processor-based accounting device that dispenses and accounts for postal value stored therein. Each PSD is a FIPS 140-2 validated cryptographic device that physically and logically protects the customer funds stored within the device. The PSD generates data for an indicum, which is represented in a 2D barcode with various data elements that are digitally signed using a FIPS approved cryptographic operation, utilizing the funds stored therein. This provides both data integrity and non-repudiation.

The United States Postal Service ("USPS") has approved on-line postage metering systems as part of the USPS Information-Based Indicia Program ("IBIP"). Such on-line postage metering systems utilize a PSD that is coupled to a server at a data center accessible through the Internet. Customers access the service either via a web application using a personal computer and printer or using a special purpose envelope printer. The application software or a web browser on the PC or special purpose envelope printer are used by the customer to request postage indicia from the server located at the data center. All functions required for generating an indicium are performed by a PSD coupled to the server, and the results are returned to the personal computer or envelope printer where the indicium can be printed on a mail piece or label.

In such systems, each PSD can either be registered for and thus dedicated to only a single customer (also referred to as a client), or registered to the postage provider and shared among clients (shared meter model). In the shared meter model, when a customer requests postage, the customer's account information is loaded to the shared PSD, thus making the shared PSD dedicated to that customer for the time during which the postage is generated. Thus, to handle multiple customers, it is necessary to provide multiple PSD's to handle transaction requests from each respective customer. Thus, a server can have multiple PSD's coupled to it such that each PSD can handle a different transaction simultaneously. When a customer requests a postage indicium, the request is sent to the PSD designated for that customer for processing of the transaction, or the customer account is sent to a shared PSD, and the results returned to the device being used by the customer. In some markets, the shared meter model is not permitted by the postal authority, and thus each PSD is dedicated to only a single customer. Thus, as new customers are added, it requires additional PSDs, one for each of the new customers. Each server can only support a limited number of PSDs, thus it is also necessary to add additional servers to handle the increase in customers, regardless of whether it is a shared meter model or not. A load balancer distributes the requests for postage among the multiple servers based on a server selection criteria configured in the load balancer. For those markets in which a PSD is dedicated to only a single customer, each server is required to have a PSD that is dedicated to each respective customer (one for each and every customer), as the load balancer has no knowledge of which server houses the PSD for the customer making the request. Thus, regardless of the server that receives the request from the load balancer for postage from that customer, there is a PSD dedicated to that customer coupled to the server to process the request.

Having multiple PSDs for each customer, one coupled to each server, or multiple PSD's for the shared meter models, creates several problems. The collection of PSDs is generally referred to as a PSD Farm. From a system point of view, needing to place a customer specific PSD in every server in the environment limits the number of customers that can be supported in the environment. This also makes the system large and complicated, especially if there are numerous customers that are low volume mailers and do not use the system frequently. From the customer point of view, funds must be placed in each PSD that is installed for that customer. Thus, for example, if a customer normally spends $50 per day in postage, each PSD that is installed for the customer must have $50 in its registers for postage. For a 6 server environment, for example, this would require the customer to put a total of $300 in postage into the PSDs, $50 in each PSD. Even though the customer may only spend $50 a day, there is no control over which PSD will actually be utilized throughout the day. Thus, it is possible that only one of the six PSDs for that customer will be used for the entire $50, or more than one PSD may be used over the course of the day. Each of these drawbacks leads to problems with the system and problems with customer acceptance.

SUMMARY OF THE INVENTION

The present invention alleviates the above problems by providing a postage generating system and method that allows for the generation of postage without the use of a PSD, while still maintaining the necessary data integrity and non-repudiation aspects of prior art systems that utilize a PSD.

According to embodiments of the present invention, when an indicium is generated, the cryptographic and accounting functions are performed separately and reconciled to ensure that every transaction, e.g., generation of indicum data and corresponding creation of an indicium, is properly accounted for and funds are deducted from the user's account. The cryptographic functions of creating a digital signature/HMAC for an indicium are performed utilizing a cloud-based Hardware Security Module (HSM). Transaction records for indicium generated by an HSM are stored in a database. The accounting is performed by a transaction server, separate and remote from the HSM, to make updates to the client's account to account for generated indicia.

An Integrity Monitor Server is utilized to monitor and ensure the consistency of the transactions, i.e., that every transaction performed by an HSM is properly accounted for by the transaction server and funds are deducted from the user's account. An inconsistency in the transactions performed by the HSM and transaction server indicates that accounting for the generated indicium has not been performed, and there is potential fraudulent or improper activity that must be investigated. The Integrity Monitor Server can initiate a mismatched transaction error process to temporarily halt any further activity within the identified customer account by both or either of the transaction server and HSM, preventing any further fraudulent or improper activity utilizing that account, and thereby maintain the security and compliance specifications required by the Posts.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, by way of example serve to explain the invention in more detail. As shown throughout the drawings, like reference numerals designate like or corresponding parts.

DETAILED DESCRIPTION

Figure 1:
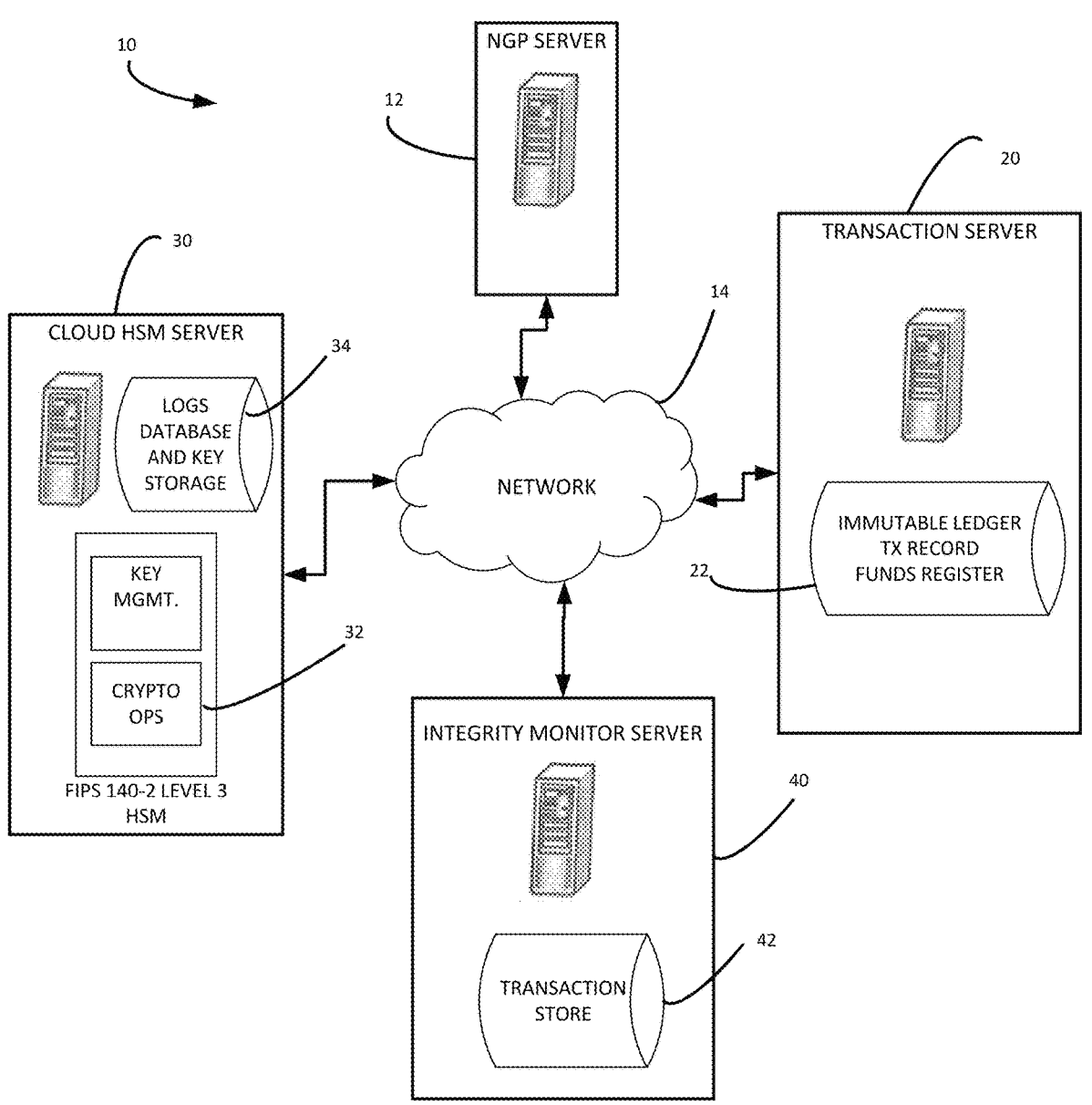
FIG. 1 illustrates in block diagram form a system architecture overview of a postage generating system 10 according to an embodiment of the present invention.

In describing the present invention, reference is made to the drawings, wherein there is seen in FIG. 1 in block diagram form a Postage Generating System 10 (also referred to herein as Next Generation Postage or NGP) according to an embodiment of the present invention. System 10 includes a plurality of servers 12, 20, 30 and 40 that are coupled to a network 14, such as, for example, a virtual private network (VPN), the Internet, or the like. One or more of servers 12, 20, 30 and 40 could be located remotely from each another, or two or more could be co-located within the same data center. Each of the servers 12, 20, 30, 40 can communicate with one or more of the other servers 12, 20, 30, 40 via the network 14. Alternatively, multiple different networks could be provided over which two of the servers 12, 20, 30, 40 can communicate directly with each other, thereby separating the communication traffic between pairs of servers. For example, server 20 and server 40 could be coupled to and communicate via a first network, while server 40 and server 30 could be coupled to and communicate via a second network. Each of the servers 12, 20, 30, 40 may be a mainframe or the like that is specially constructed for the required purposes, or it may comprise a general purpose computer selectively activated or reconfigured by a computer program stored therein to perform the required functions. Such a computer program may alternatively be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, which are executable by a processing device within each server 12, 20, 30, 40. One of ordinary skill in the art would be familiar with the general components of a server system upon which the method of the present invention may be performed.

The postage generating service is a cloud computing-based service which performs the traditional metering functions of funds accounting and cryptography. It consists of an Next Generation Postage (NGP) server 12 that coordinates operation of the system 10, a transaction server 20 that is coupled with and maintains a database 22 having an immutable transaction ledger, an integrity monitor server 40 having a transaction store database 42, and one or more FIPS 140-2 level 3 certified Cloud Hardware Security Modules (HSM's) 32 controlled by a Cloud HSM Server 30. Alternatively, the functions of the Cloud HSM 32 could be performed using a cryptographic software library. Cloud HSM's 32 could be, for example, the AWS CloudHSM offered by Amazon Web Services. Unlike conventional PSD's, the HSM's 32 are not dedicated to only a single postage customer, and do not need to be owned by the postage provider, operated by the postage provider, or registered by a post to the postage provider and shared among clients. The Cloud HSM Server 30 provides cryptographic key management and cryptographic operations, and is coupled with a logs database 34 to store records of activity. The immutable transaction ledger in database 22 maintains a cryptographic hash chain of every postage credit and debit transaction, similar to a blockchain. This ensures that transactions cannot be modified or deleted without detection. Thus, key features of the ledger preferably include an append-only functionality, and an immutable, document-based database in which documents are organized in a Merkel Tree using a SHA-256 hash. APIs are provided to verify proof of any document revision against the digest of a maintained journal of activity. The ledger of database 22 is preferably a quasi-blockchain type of ledger, where centralized trust avoids a multiple party consensus and does not incentivize participants to make fraudulent changes. There is no risk of phantom or dirty reads, and a data stream is provided in real time, using for example, a managed, scalable, cloud-based service that allows real-time processing of streaming large amounts of data per second, such as, for example, Amazon Kinesis. In addition, data is encrypted at rest using a standard key management service.

Each transaction record/journal stored in the ledger of database 22 preferably includes at least a meter serial number, the ascending register value, the descending register value, a piece count, and the transaction contents or reference number, e.g., the indicium data and signature, a refill/add funds/PVD transaction data and signature, a financial reference number (CH trace number, Credit Card transaction ID/confirmation number, etc.), and for short pay adjustment requests from a Post a debit transaction record and signature.

The NGP Server 12 coordinates the crediting and debiting of funds, cryptographic operations, recording of transactions in the immutable ledger of database 22 and creation of postal reports. The Hardware Security Modules 32 secure the keys associated with each device/client and perform the cryptographic operations necessary to request postage refills and create indicia.

Figure 2:
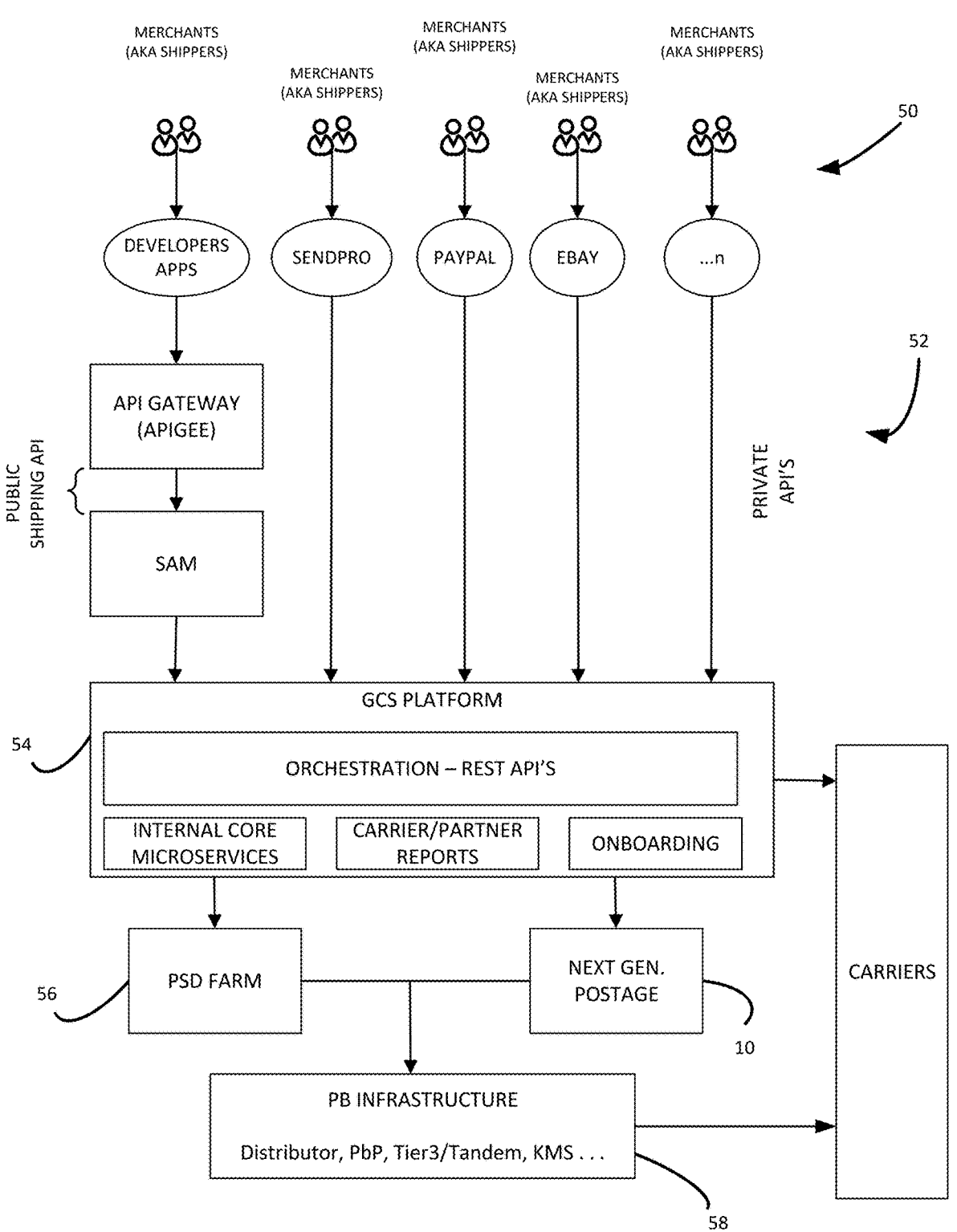
FIG. 2 illustrates in block diagram form an exemplary environment in which the postage generating system 10 of FIG. 1 could be used according to an embodiment of the present invention.

Referring now to FIG. 2, there is illustrated in block diagram form an exemplary environment in which the Postage Generating System 10 could be used according to embodiments of the present invention. A customer seeking generation of a postage indicium, e.g., merchants (aka shippers) 50 can access a Global Carrier Shipping Platform 54 using APIs 52 to request postage indicia. The GCS Platform 54 is connected to the Postage Generating System 10, and can additionally be connected to a traditional PSD Farm 56. Because the Postage Generating System 10 of the present invention does not require any changes to the already known GCS Platform 54, it can be used in parallel with traditional PSD Farm 56. Each of the PSD Farm 56 and NGP System 10 connect, via a network (e.g., network 14), to a postal provider infrastructure 58 that provides overall management of user's accounts.

Figure 3:
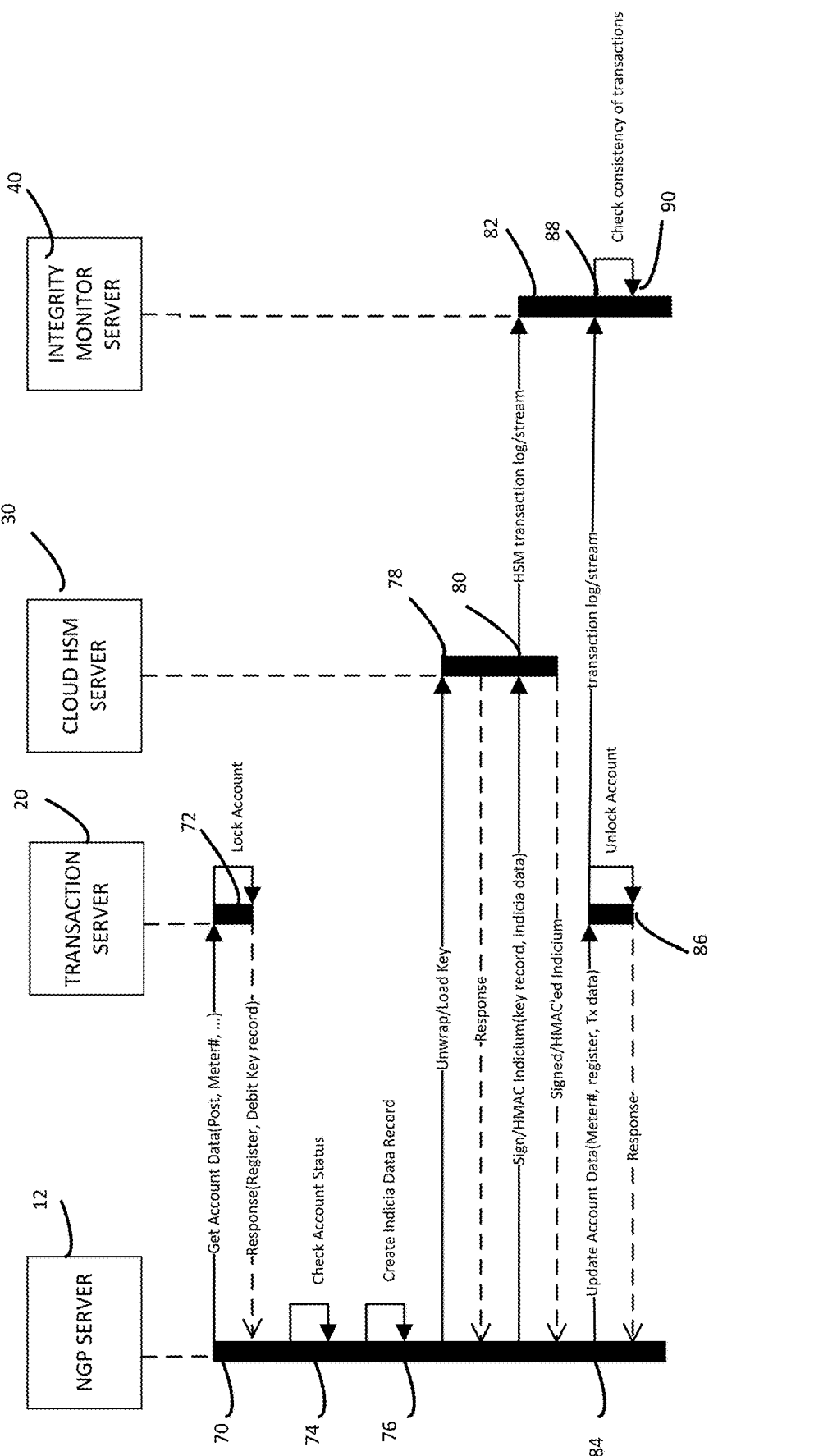
FIG. 3 illustrates the sequence of how an indicium is created by the Postage Generating System 10 illustrated in FIG. 1 according to an embodiment of the present invention.

Referring now to FIG. 3, there is illustrated the creation of an indicium by the system 10 illustrated in FIG. 1. In step 70, when the NGP Server 12 receives a request to generate postage, e.g., from a merchant 50, the account data for the requesting merchant is retrieved from the database 22 of the Transaction Server 20. The account data can include, for example, the Post (e.g., USPS, Royal Mail, etc.) under which the indicum will be generated, the meter account number, funds register values (ascending register AR, descending register DR, and piece count), the cryptographic key or keys associated with the account (which may or may not be encrypted), a key identifier (which identifies the key(s) to be used for that account), etc. In step 72, upon providing the account data to the NGP Server 12, the Transaction Server 20 will lock the merchant's account, meaning that no changes can be made to the data stored in that account in database 22. In step 74, the NGP Server 12 performs a Check Account Status function, which can include, for example, determining if the account is currently active, i.e., it has not been suspended or expired due to inactivity, if the cryptographic keys associated with the account have expired or been disabled, and if there are any limits for the AR, DR or Piece Count registers that have been exceeded. In step 76, the NGP Server 12 creates an indicium data record, which can include, for example, the meter account number, postage amount, funds register values or piece count, date, mail class or server, etc. In step 78, if the cryptographic keys are included in the account record associated with the merchant's account, then the cryptographic key(s) are sent to the Cloud HSM Server 30, and a confirmation response is sent back to the NGP Server 12. If the account record includes a key identifier, the key identifier is sent to the Cloud HSM Server 30, which retrieves the identified key(s) from the database 34. The wrapped key(s) are loaded into a selected HSM 32 where it is unwrapped, e.g., decrypted, and ready for use. The wrapped key will also preferably be persisted in a keystore operated by the postage generating system 10. Different types of keys and signing algorithms can be used for compliance with postal requirements. All cryptographic operations are performed by the HSM 32 under control of the Cloud HSM Server 30. For security purposes, an unwrapped key is never available outside of the HSM 32.

In step 80, the HSM 32 performs the necessary cryptographic functions to generate a digital signature/HMAC (hashed-based message authentication code) for the specific transaction, including the key record, the indicium data, and any other data deemed necessary. Also in step 80, the signed/HMAC'ed indicium is returned to the NGP Server 12 for delivery to the requesting merchant for use. The signature/HMAC can now be used to verify the data integrity and the authenticity of the message (postage indicium), thereby providing evidence that postage was paid. It is important to note that the accounting for the postage, i.e., adjusting the register values, is not performed by the HSM 32, as compared with the prior art postage generating systems where the cryptographic functions and accounting are all performed within the same device, e.g., a PSD. In step 82, the transaction log from the transaction just completed is sent from the Cloud HSM Server 30 to the Integrity Monitor Server 40, and the signed/HMAC'ed indicium is sent to the NGP Server 12. In step 84, upon receiving the signed/HMAC'ed indicium from the Cloud HSM Server 30, the NGP Server 12 updates the account data for the merchant's account, including the register values, piece count, etc., and sends the updated account information to the Transaction Server 20. In step 86, the Transaction Server 20 unlocks the account (it was locked in step 72 above) in database 22, and updates the now unlocked account to include the transaction data from this transaction. Updating the account data includes writing all updated register values and a copy of the indicium transaction, including the signature/HMAC, to the account that is stored in database 22. Thus, it is at this point that the accounting is actually performed, and the register values are actually updated to account for the postage value used for the indicium. A response is sent to the NGP Server 12 indicating a successful update. In step 88, the Transaction Server 20 sends the transaction data to the Integrity Monitor Server 40. To ensure that all transaction are properly accounted for, i.e., for every indicium generated by the Cloud HSM Server 30 there is a corresponding accounting performed by the Transaction Server 20, in step 90 the Integrity Monitor Server 40 checks for consistency of transactions using the transaction logs received from the Cloud HSM Server 30 in step 82 and the transaction data received from the Transaction Server 20 in step 88 as further described below with respect to FIGS. 4A and 4B.

Figure 4A:
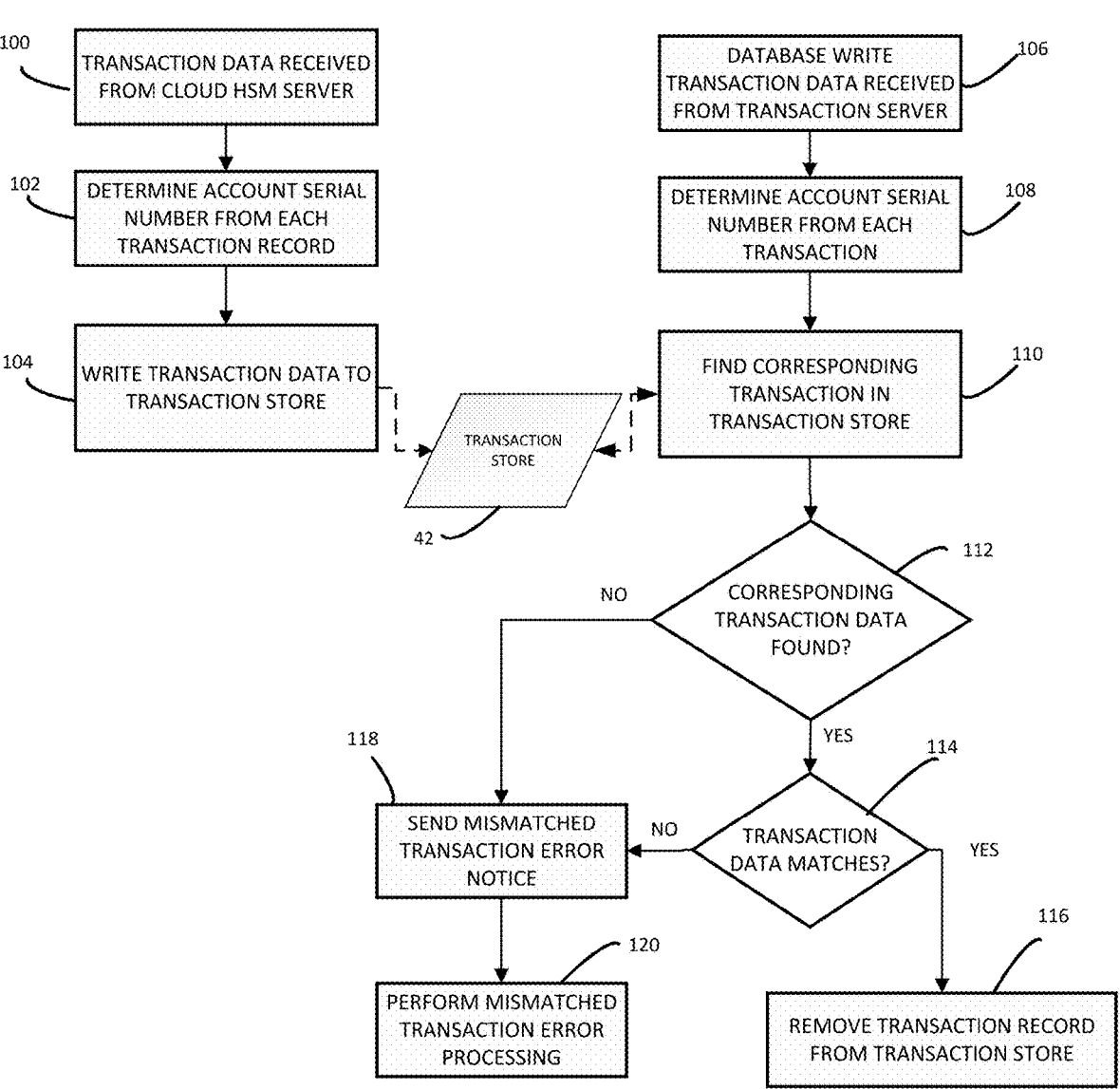
FIGS. 4A and 4B illustrate in flowchart form the operation of the Integrity Monitor Server 40 to monitor and ensure that every transaction performed by the Postage Generating System 10 of FIG. 1 is properly accounted for and funds are deducted from the user's account according to an embodiment of the present invention.
Figure 4B:
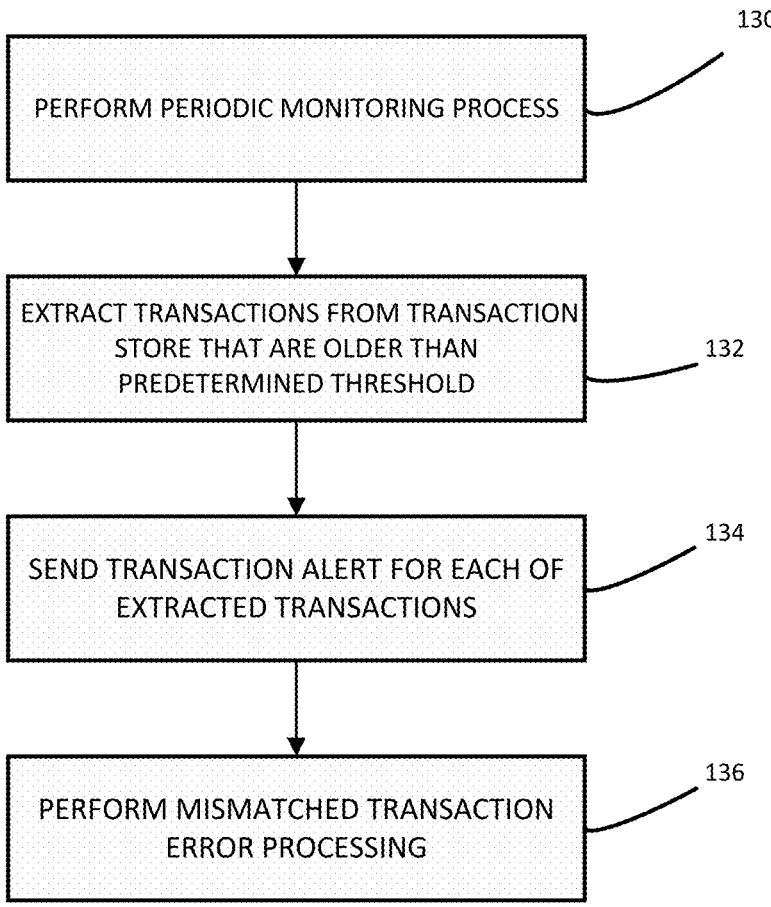

In accordance with embodiments of the present invention, the Integrity Monitor Server 40 provides the necessary monitoring and security to ensure that every transaction, e.g., creation of an indicium, is properly accounted for and funds are deducted from the user's account. FIGS. 4A and 4B illustrate in flow diagram form the operation of the Integrity Monitor Server 40 to monitor and ensure the consistency of the transactions, i.e., that every transaction performed by the Cloud HSM Server 30 is properly accounted for by the Transaction Server 20 and funds are deducted from the user's account. The Integrity Monitor Server 40 serves as an independent service responsible for checking for consistency between signing activities by a HSM 32 of the Cloud HSM Server 30 and debit/signing records in the stored in the database 22 of Transaction Server 20.

In step 100, the Integrity Monitor Server 40 receives transaction data in the form of a transaction record from the HSM Cloud Server 30 (refer to step 82 of FIG. 3). In step 102, the Integrity Monitor Server 40 determines the account serial number from each transaction record and in step 104 the transaction data is written to the transaction store 42 in association with the account serial number. Preferably concurrently with steps 100-104, in step 106 the Integrity Monitor Server 40 receives from the Transaction Server 20 the transaction data that was written to the database 22 (refer to step 88 of FIG. 3) in the form of a transaction record. In step 108, the Integrity Monitor Server 40 determines the account serial number from each transaction record. In step 110, the transaction store 42 is searched to find the corresponding transaction data based on the account serial number from the Cloud HSM Server 30 that was stored in step 104. In step 112, it is determined if corresponding transaction data is stored in the transaction store 42. If in step 112 it is determined that there is no corresponding transaction data stored in the transaction store 42, then in step 118 the Integrity Monitor Server 40 will send a mismatched transaction error notice to one or more of the NGP Server 12, the Transaction Server 20 and Cloud HSM Server 30. If corresponding transaction data is found in step 112, then in step 114 the Integrity Monitor Server 40 compares the corresponding transaction data from the Cloud HSM Server 30 stored in the transaction store 42 with the transaction data from the Transaction Server 30 to determine if the data matches, i.e., the data within each of the transaction records corresponds. The transaction data preferably includes, for example, the account serial number, the postage amount, the piece count, the values of the Ascending Register, Descending Register, and Piece Count register, the transaction identification, digital signature, time stamp of the transaction, and other information that uniquely identifies each transaction. If the transaction data matches, providing verification that the transaction performed by the HSM Cloud Server 30 has been properly accounted for by the Transaction Server 20, then in step 116 the transaction record from the Cloud HSM Server 30 that was compared in step 114 is removed from the transaction store 42. If, however, the transaction data does not match, e.g., the postage amount is different, the digital signatures don't match, or any other inconsistency, then in step 118 the Integrity Monitor Server 40 will send a mismatched transaction error notice to one or more of the NGP Server 12, the Transaction Server 20 and Cloud HSM Server 30. In accordance with some embodiments, depending upon the security level desired, comparing the transaction data in step 114 may be optionally performed. In this instance, provided there is some type of corresponding transaction data found in step 112, then step 114 could be skipped and go right to step 116.

Upon receipt of a mismatched transaction error, in step 120, one or more of several mismatched transaction error processing actions can be performed by one or more of the NGP Server 12, the Transaction Server 20 and/or the Cloud HSM Server 30. In accordance with some embodiments, the account serial number for the mismatched transactions can be added to a Certificate Revocation List (CRL), thereby preventing any further indicia from being generated for that account as the Cloud HSM Server will not allow an HSM 32 to generate digital signatures for any account that is on the CRL. In accordance with some embodiments, the NGP Server 12 can disable any further debiting of the account by the Transaction Server 20 (such as, for example, by locking the account). In accordance with some embodiments, access to the cryptographic keys associated with that account serial number can be disabled by the Cloud HSM Server, thereby preventing any further indicia from being generated for that account. In accordance with some embodiments, operations staff of system 10 could be notified, and the account remain in an active state until further mismatched transactions are encountered.

The processing performed in FIG. 4A will identify transactions performed by the Cloud HSM Server 30 and Transaction Server 20 that do not correspond, or transactions performed by the Transaction Server 20 for which there is no corresponding transaction performed by the Cloud HSM Server 30. It is also important to identify those situations where an indicium was created, i.e., a transaction was performed by the Cloud HSM Server 30, but there is no corresponding transaction received from the Transaction Server 20 indicating proper accounting for the created indicium has been performed. Referring now to FIG. 4B, there is described the processing performed by the Integrity Monitor Server 40 to identify such instances. In step 130 the Integrity Monitor Server 40 performs a periodic monitoring of transactions stored in the transaction store 42. Recall from step 116 of FIG. 4A that if a transaction corresponding to one stored in the transaction store 42 was found and the transaction data matched, that transaction record was removed from the transaction store 42. Thus, if no corresponding transaction data from the Transaction Server 20 was found for a transaction record from the Cloud HSM Server 30, that transaction record will continue to be stored in the transaction store 42. Such periodic monitoring will identify such transaction records, and is preferably performed every few minutes, e.g., 3-5 minutes, to find transactions that are stored for which no corresponding transaction from the Transaction Server 20 is identified. Performing the monitoring every couple of minutes will allow for any delays within the system 10 of transactions records being sent to the Integrity Monitor Server 40 from the Cloud HSM Server 30 and the Transaction Server 20. In step 132, any transactions stored in the transaction store 42 that are older than a predetermined threshold time period are extracted from the transaction store 42. The predetermined threshold time period is preferably shorter than the time of the periodic processing, and typical values can range from a few seconds, e.g., 3 seconds, to a couple of minutes, e.g., 2 minutes. In step 134, a transaction alert for each of the extracted transactions is sent to one or more of the NGP Server 12, the Transaction Server 20 and Cloud HSM Server 30. In step 136, one or more of several mismatched transaction error processing actions can be performed by the NGP Server 12, the Transaction Server 20 and/or the Cloud HSM Server 30 as previously described with respect to step 120 of FIG. 4A. Thus, while the processing described in steps 114-120 of FIG. 4A addresses those situations in which there are corresponding transactions but the data within each transaction record does not match, the processing described in steps 130-136 of FIG. 4B addresses those situations in which the HSM Cloud Server 30 generated an indicium (thereby generating a transaction record), but there is no corresponding transaction record generated by the Transaction Server 20. This indicates that accounting for the generated indicium has not been performed, and there is potential fraudulent or improper activity that must be investigated. The mismatched transaction error processing can temporarily halt any further activity within the identified customer account, preventing any further fraudulent or improper activity utilizing that account, and thereby maintaining the security and compliance specifications required by the Posts.

The transaction and integrity monitoring flow implementation of the present invention addresses several functional, performance, security, and compliance requirements: (i) Functional requirements and performance: indicia signing transactions are handled in a secured, accountable, but highly performing manner. Performance supporting high volume concurrent traffic is important especially for automated incoming requests. Process flow and operation are optimized (e.g.: minimize locking time and number of operations to data base 22). (ii) Reliability: transaction records that include financial (postage debit) and signing information are reliably entered in an immutable storage like data base 22. This record is annotated with unique transaction/correlation ID for future reconciliation and reference purpose. (iii) Security: NGP services, including the orchestration and supporting microservices, are constructed to mimic the level of security achieved by conventional hardware-based PSDs. Proper machine level authentication and authorization are in place. Additional measures are incorporated to defend against cyber attacks and frauds. (iv) Compliance: the postage generating system 10 of the present invention provides a similar assurance in terms of integrity checks and balances to conventional hardware-based devices, e.g., a PSD, that provides a single, secured environment that guarantees the integrity between proper debits and signing. For example, the transaction flow involves (a) locks of register balance/value, (b) balance and fund level check, (c) secured signing through Cloud HSM, (d) immutable recording of debit and signing information, and (e) release of register locks. Security is provided via the Cloud HSMs 32 and immutable ledger of database 22, as well as access control to the system 10:

The NGP microservices (key management system, ledger) abstracts and prevents direct calls to Cloud HSM Server 30 and data base 2l layers.

The incoming transaction to the Postage Transaction Manager (PTM, orchestration layer) are authenticated. Note that this is related to machine-machine authentication and not user based.

The indicia cannot be returned from the orchestrator to the requestor without proper recording of the transaction in data base 22.

Figure 5:
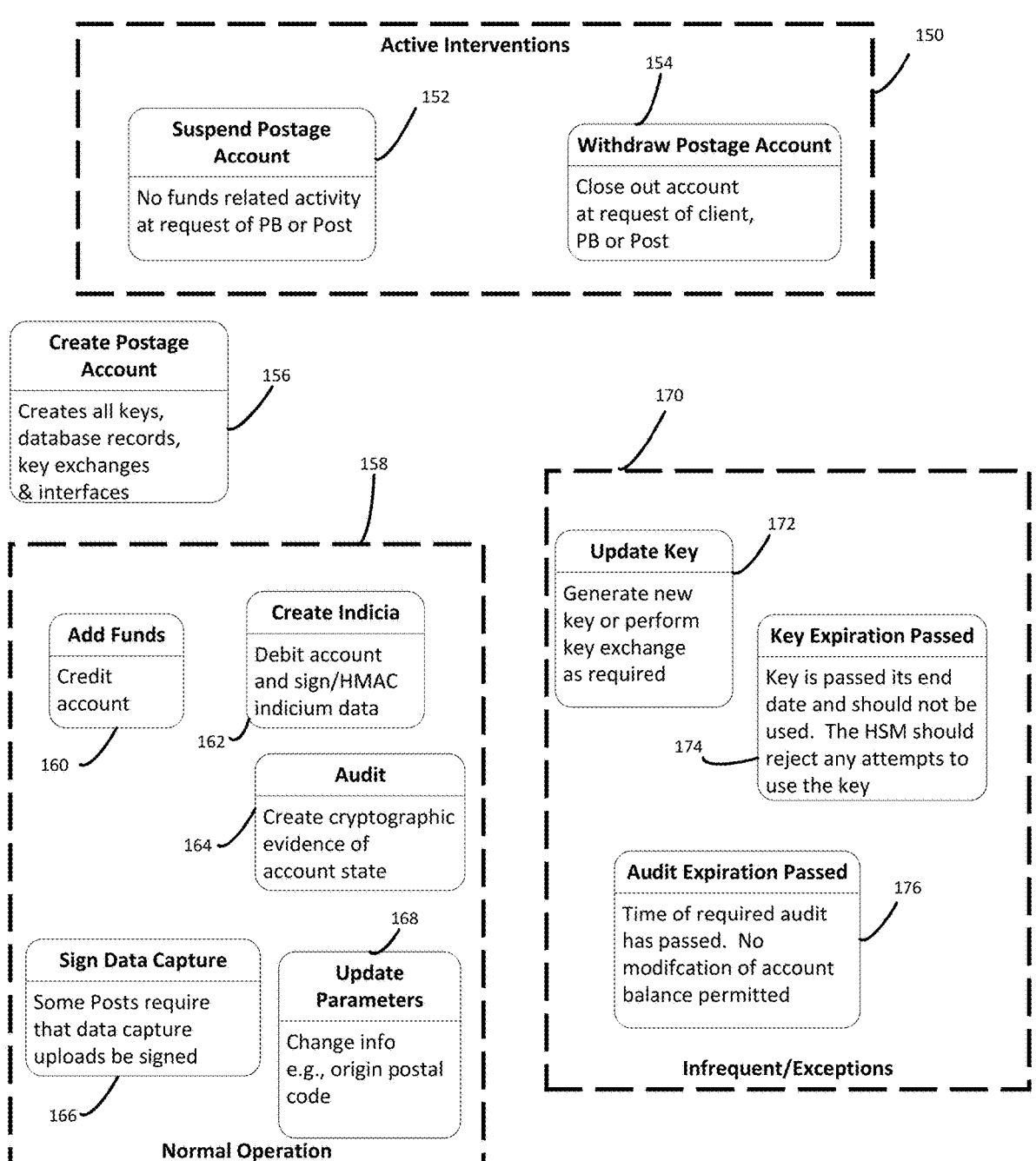
FIG. 5 illustrates in block diagram form the different operations that the Postage Generating System 10 of FIG. 1 can perform according to embodiments of the present invention.

FIG. 5 illustrates in block diagram form the different operations that the system 10 can perform. Active Interventions 150 include suspending a postage account 152, which will prevent any funds activity at the request of the postage service provider or a Post, e.g., USPS, and a withdraw postage account 154, where a postage account can be closed at the request of the customer (owner of the postage account), the postage service provider or a Post. Create Postage Account 156 includes creating the necessary keys used for performing the digital signature signing, creating the records for the database 22, and creating the key exchanges and interfaces required. Keys are preferably created by Cloud HSM 32 and wrapped by Cloud HSM 32 for storage in Key Storage 34 and/or the immutable ledger of database 22. Normal Operations 158 include adding funds 160 by crediting the user's account with funds; creating indicia 162 by debiting the user's account and signing/HMAC the indicium data; performing an Audit 164 by creating cryptographic evidence of the account state; signing data capture 166 if required by a Post (data capture is uploading to the Post a record of representative transactions, which could include a summary of transactions or individual transaction data); and updating parameters 168 to change information, e.g., the origin postal code. Infrequent/Exceptions 170 includes Updating Key 172 to generate a new key or perform a key exchange as required; Key Expiration Passed 174 to alert the HSM Cloud Server 30 that a key has expired and any attempts to use an expired key should be rejected; and an Audit Expiration Passed 176 when the time for a required audit has passed with the appropriate audit being conducted, and the account balance cannot be modified until such audit has been completed.

Figure 6:
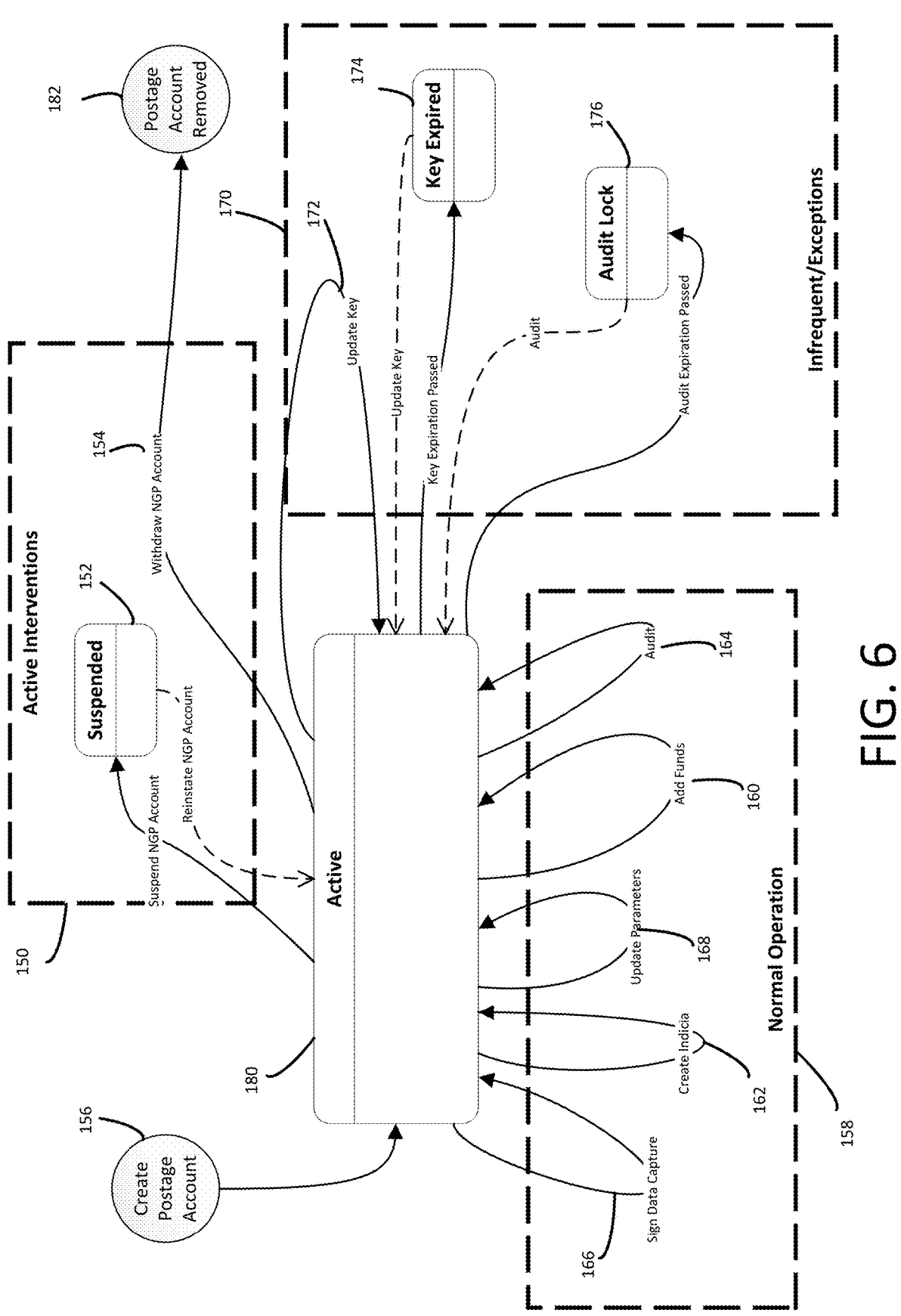
FIG. 6 illustrates in block diagram form a state diagram of the Postage Generating System 10 illustrated in FIG. 1 according to an embodiment of the present invention.

FIG. 6 illustrates in block diagram form a state diagram for the system 10 showing the functions described with respect to FIG. 5. Upon creation of a postage account 156 an Active State 180 is entered. When in the Active State 180, the system 10 can perform Normal Operations 158, Infrequent/Exceptions Operations 170, and Active Interventions 150 as described above with respect to FIG. 5. The system 10 can remain in the Active State 180 until the account is withdrawn 154, at which point the postage account is removed 182 and no further actions with respect to that account can be performed.

Table 1 below shows a comparison of the functions performed by the NGP system 10 of the present invention with a conventional PSD Farm 72.

TABLE 1

| Function | PSD Farm | NGP |
|---|---|---|
| Signing/HMAC | PSD | HSM Cluster |
| Key Generation | Asymmetric: PSD Symmetric: Key Management System (KMS) | Asymmetric: HSM Symmetric: HSM |
| Key Storage | Non Volatile Memory (NVM) in PSD | Advanced Encryption Standard (AES) Wrapped in Database |
| Key Availability | Private: PSD Symmetric: PSD & KMS | Private: HSM Cluster Symmetric: HSM Cluster |
| Key Recovery | Asymmetric: None Symmetric: KMS | AES Wrapped in Database |
| Key Zeroization | Command, Tamper | HSM: Command, Tamper AES Wrapped in Database: None |
| Funds Balance | NVM in PSD | Immutable Database |
| Funds Register Modification | PSD | NGP Server |
| Transaction Integrity | PSD | Independent real-time monitoring by Integrity Monitor Server |
| Question of Accurate Registration (QAR) | Indicia Creation Record/Data Capture History, GCS Logs | Full Transaction History (database), GCS Logs |
| Refill Authorization | Postage-by-Phone | Postage-by-Phone |
| Remote Inspection | Remote: PB Infrastructure PSD: PSD | Remote: PB Infrastructure NGP: Database, NGP Server, Cloud HSM |

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for generating an indicium that evidences payment of postage through use of a postage generating system, the postage generating system including a plurality of servers coupled to a network, the method comprising:

receiving, at a postage server, a request to generate the indicium from a shipper;

retrieving, by the postage server, an account associated with the shipper from a database having an immutable transaction ledger maintained by a transaction server;

generating, by the postage server, an indicium data record for the requested indicium, and sending at least a portion of the indicium data record to a hardware security module server;

performing, by the hardware security module server, cryptographic operations on one or more parts of the at least a portion of the indicium data record to generate the indicium, the cryptographic operations not including any accounting functions to account for the indicium in the account associated with the shipper;

sending, by the hardware security module server to the postage server, the generated indicium, and sending, by the hardware security module server to an integrity monitor server, a transaction log for the generated indicium;

receiving, by the integrity monitor server, the transaction log for the generated indicium from the hardware security module server and storing, by the integrity monitor server, the transaction log in a transaction database maintained by the integrity monitor server;

updating in the immutable transaction ledger by the postage server, the account associated with the shipper based on the generated indicium received from the hardware security module server, and sending the updated account to the transaction server;

sending, by the transaction server, an account transaction log to the integrity monitor server;

receiving, by the integrity monitor server, the account transaction log from the transaction server;

determining, by the integrity monitor server, if there is a transaction log stored in the transaction database that corresponds to the account transaction log received from the transaction server;

if it is determined by the integrity monitor server that there is a transaction log stored in the transaction database that corresponds to the account transaction log received from the transaction server, removing the transaction log stored in the transaction database that corresponds to the account transaction log received from the transaction server; and if it is determined by the integrity monitor server that there is not a transaction log stored in the transaction database that corresponds to the account transaction log received from the transaction server, performing a mismatched transaction error process for the account associated with the shipper.

2. The method of claim 1, wherein the mismatched transaction error process further comprises preventing any further indicia from being generated using the account associated with the shipper.

3. The method of claim 1, wherein if it is determined by the integrity monitor server that there is a transaction log stored in the transaction database that corresponds to the account transaction log received from the transaction server, the method further comprises:

comparing data contained in the transaction log stored in the transaction database with data contained in the account transaction log received from the transaction server;

removing the transaction log stored in the transaction database if the data contained in the transaction log stored in the transaction database matches the data contained in the account transaction log received from the transaction server; and performing the mismatched transaction error process for the account associated with the shipper if the data contained in the transaction log stored in the transaction database does not match the data contained in the account transaction log received from the transaction server.

4. The method of claim 1, further comprising:

locking, by the transaction server, the account associated with the shipper after the account has been retrieved by the postage server such that no modifications to data in the account can be made;

unlocking, by the transaction server, the account associated with the shipper when the updated account is received from the postage server; and updating the account associated with the shipper that is stored in the database maintained by the transaction server.

5. The method of claim 4, wherein updating the account associated with the shipper that is stored in the database maintained by the transaction server includes updating register values for a value of postage used for the indicium to account for the indicium in the account associated with the shipper.

6. The method of claim 1, wherein performing cryptographic operations further comprises:

generating a digital signature or message authentication code using one or more cryptographic keys.

7. The method of claim 1, further comprising:

periodically monitoring at a predetermined interval, by the integrity monitor server, the transaction database to identify any transaction logs stored in the transaction database that are older than a predetermined threshold time period; and performing the mismatched transaction error process for the account associated with the shipper for any user accounts for which there are transaction logs stored in the transaction database that are older than the predetermined threshold time period.

8. The method of claim 7, further comprising:

extracting, by the integrity monitor server, the transaction logs stored in the transaction database that are older than the predetermined threshold time period.

9. The method according to claim 7, wherein the predetermined threshold time period is in the range of approximately 3 seconds to 120 seconds.

10. The method according to claim 7, wherein the predetermined threshold time period is shorter than the predetermined interval.

11. A method for generating postage in a postage generating system including a plurality of devices communicating via a network, the method comprising the steps of:

receiving, at a postage server, a request to generate an indicium from a device used by a customer that is connected to the network;

retrieving, by the postage server, an account associated with the customer from a database having an immutable transaction ledger maintained by a transaction server;

locking, by the transaction server, the account associated with the customer after the account has been retrieved by the postage server such that no modifications to data in the account can be made;

generating, by the postage server, an indicium data record for the requested indicium, and sending at least a portion of the indicium data record to a hardware security module server;

performing, by the hardware security module server, cryptographic operations on one or more parts of the at least a portion of the indicium data record to generate the indicium, the cryptographic operations not including any accounting functions to account for the indicium in the account associated with the customer;

sending, by the hardware security module server to the postage server, the generated indicium;

sending, by the postage server, the generated indicium to the device used by the customer for printing by the device;

sending, by the hardware security module server to an integrity monitor server, a transaction log for the generated indicium;

receiving, by the integrity monitor server, the transaction log from the hardware security module server;

storing, by the integrity monitor server, the transaction log in a transaction database maintained by the integrity monitor server;

updating by the postage server, the account associated with the customer based on the generated indicium received from the hardware security module server, unlocking, by the transaction server, the account associated with the customer after the account has been updated and sending the updated account to the transaction server;

sending, by the transaction server, an account transaction log to the integrity monitor server;

receiving, by the integrity monitor service, the account transaction log from the transaction server;

determining, by the integrity monitor server, if there is a transaction log stored in the transaction database that corresponds to the account transaction log received from the transaction server;

if it is determined by the integrity monitor server that there is a transaction log stored in the transaction database that corresponds to the account transaction log received from the transaction server, removing the transaction log stored in the transaction database that corresponds to the account transaction log received from the transaction server; and if it is determined by the integrity monitor server that there is not a transaction log stored in the transaction database that corresponds to the account transaction log received from the transaction server, performing a mismatched transaction error process for the account associated with the customer.

12. A method for generating an indicium that evidences payment of postage through use of a postage generating system, the postage generating system including a plurality of servers coupled to a network, the method comprising:

receiving, by a postage server, a request to generate an indicium from a device, the request including account data;

retrieving, by the postage service, an account associated with the account data from a transaction server, the transaction server maintaining a database having an immutable transaction ledger maintaining a cryptographic hash chain of postage credit and debit transactions for the account;

locking, via the transaction server, the account associated with the account data, thereby preventing changes to be made to the account data in the database;

creating, via the postage server, an indicium data record for the requested indicium and sending the indicium data record to a hardware security module server;

generating, by the hardware security module server, a hashed-based message authentication code via cryptographic functions based on the indicium data record, the cryptographic functions not including any accounting functions to account for the indicium in the account associated with the account data;

returning, via the hardware security module server, the hashed-based message authentication code to the postage server for delivery to the device;

sending, via the hardware security module server, a transaction log for the generated hashed-based message authentication code to an integrity monitor server;

storing, by the integrity monitor server the transaction log in a transaction database maintained by the integrity monitor server;

updating, via the postage server, the account data of the account based on the hashed-based message authentication code received from the hardware security module server;

sending, via the postage server, the updated account data to the transaction server;

unlocking, via the transaction server; the account and updating the account to include the updated account data;

sending, via the transaction server, an account transaction log to the integrity monitor server;

receiving, by the integrity monitor server, the account transaction log from the transaction server;

determining, by the integrity monitor server, if there is a transaction log stored in the transaction database that corresponds to the account transaction log received from the transaction server;

if it is determined by the integrity monitor server that there is a transaction log stored in the transaction database that corresponds to the account transaction log received from the transaction server, removing the transaction log stored in the transaction database that corresponds to the account transaction log received from the transaction server and not locking the account;

printing, via the device, the indicium; and if it is determined by the integrity monitor server that there is not a transaction log stored in the transaction database that corresponds to the account transaction log received from the transaction server, performing a mismatched transaction error process for the account associated with the device.

13. The method of claim 12, wherein if it is determined by the postage server that there is a transaction log stored in the transaction database that corresponds to the account transaction log received from the hardware security module server, the method further comprises:

comparing data contained in the transaction log stored in the transaction database with data contained in the account transaction log received from the hardware security module server;

removing the transaction log stored in the transaction database if the data contained in the transaction log stored in the transaction database matches the data contained in the account transaction log received from the transaction server; and performing the mismatched transaction error process to prevent any further indicia from being generated using the account if the data contained in the transaction log stored in the transaction database does not match the data contained in the account transaction log received from the hardware security module server.

14. The method of claim 12, further comprising:

periodically monitoring, by the postage server, the transaction database to identify any transaction logs stored in the transaction database that are older than a predetermined threshold time period; and performing the mismatched transaction error process to prevent any further indicia from being generated using the account if there are transaction logs stored in the transaction database that are older than the predetermined threshold time period.

15. The method of claim 14, further comprising:

extracting, by the postage server, the transaction logs stored in the transaction database that are older than the predetermined threshold time period.

16. The method according to claim 14, wherein the predetermined threshold time period is in the range of approximately 3 seconds to 120 seconds.

17. A method for generating postal indicia in a postage generating system without using a postal security device, the method comprising the steps of:

receiving, at a postage server, a large volume of requests to generate a postal indicium for each request;

maintaining, by a transaction server, a database having an immutable transaction ledger;

retrieving from the transaction server, by the postage server, an account associated with each request from the immutable transaction ledger of the database;

generating, by the postage server, an indicium data record for each requested indicium;

sending, by the postage server, at least a portion of the indicium data record for each requested indicium to a hardware security module server;

performing, by the hardware security module server, cryptographic operations on at least a portion of the indicium data record to generate each respective requested indicium, the cryptographic operations not including any accounting functions by the hardware security module server to account for each respective requested indicium in the account associated with each request;

sending to the postage server, by the hardware security module server, each generated indicium;

sending to an integrity monitor server, by the hardware security module server, a transaction log for each generated indicium;

receiving, by the integrity monitor server, the transaction log for each generated indicium from the hardware security module server;

storing, by the integrity monitor server, the transaction log for each generated indicium in a transaction database maintained by the integrity monitor server, wherein storing includes real-time processing of streaming large amounts of data per second;

updating, by the postage server, the account associated with each request based on each generated indicium received from the hardware security module server;

sending, by the postage server, each updated account to the transaction server;

sending, by the transaction server, an account transaction log for each generated indicium to the integrity monitor server;

receiving, by the integrity monitor server, the account transaction log for each generated indicium from the transaction server;

determining, by the integrity monitor server, if for each generated indicium there is a transaction log stored in the transaction database that corresponds to the account transaction log received from the transaction server;

if it is determined by the integrity monitor server that there is a transaction log stored in the transaction database that corresponds to the account transaction log received from the transaction server, removing the transaction log stored in the transaction database that corresponds to the account transaction log received from the transaction server; and if it is determined by the integrity monitor server that there is not a transaction log stored in the transaction database that corresponds to the account transaction log received from the transaction server, performing a mismatched transaction error process for the respective account.

18. The method of claim 17, wherein the automated requests are associated with a plurality of customers.

19. The method of claim 17, wherein if it is determined by the integrity monitor server that there is not a transaction log stored in the transaction database that corresponds to the account transaction log received from the transaction server, locking the account associated with the respective indicium.

20. A method for generating an indicium that evidences payment of postage, the method comprising:

maintaining, at a transaction server, a database of a plurality of accounts, the database having an immutable transaction ledger of payments of postage for each of the plurality of accounts;

receiving, at a postage server, a request to generate the indicium from a shipper, wherein in response to the request, the postage server retrieves from the transaction server an account associated with the shipper from the plurality of accounts, generates an indicium data record for the account, and sends the indicium data record to a hardware security module server; and receiving, at the hardware security module server, the indicium data record, wherein, in response to receiving the indicium data record, the hardware security module server cryptographically generates the indicium without performing any accounting function.

21. The method of claim 20, wherein, in response to receiving the indicium data record, the hardware security module sends the indicium to the postage server and sends a transaction log to an integrity monitor server.

22. The method of claim 21, further comprising:

receiving, at the integrity monitor server, the transaction log, wherein, in response to receiving the transaction log, the integrity monitor server stores the transaction log in a transaction database;

receiving, at the postage server, the indicium, wherein, in response to receiving the indicium, the postage server generates updated account information for the account based on the indicium and sends the updated account information to the transaction server;

receiving, at the transaction server, the updated account information, wherein, in response to receiving the updated account information, the transaction server updates the immutable transaction ledger and sends an account transaction log to the integrity monitor server; and receiving, at the integrity monitor server, the account transaction log, wherein, in response to receiving the account transaction log, the integrity monitor server removes the transaction log from the transaction database if the transaction log corresponds to the account transaction log or performs a mismatched transaction error process for the account if the transaction log does not correspond to the account transaction log.

\* \* \* \* \*